United States Patent
Simon et al.

[11] 3,882,789
[45] May 13, 1975

[54] ELECTROMAGNETICALLY OPERATED OVERHUNG AND/OR UNDERHUNG SUSPENSION VEHICLE

[76] Inventors: Michael Simon, Reginbaldstrasse 4, 8 Munich-Obermenzing; Rolf-Dieter Rose, Kochstrasse 11, 85 Nurnberg, both of Germany

[22] Filed: Jan. 15, 1973

[21] Appl. No.: 323,415

[30] Foreign Application Priority Data
Jan. 15, 1972 Germany............................ 2201923

[52] U.S. Cl................... 104/148 MS; 104/148 LM
[51] Int. Cl............................................. B61b 13/08
[58] Field of Search.. 104/148 MS, 148 LM, 148 SS

[56] References Cited
UNITED STATES PATENTS
| | | | |
|---|---|---|---|
| 3,616,762 | 11/1971 | Benner | 104/148 LM |
| 3,638,093 | 1/1972 | Ross | 104/148 MS |
| 3,736,880 | 6/1973 | Ross | 104/148 MS |

FOREIGN PATENTS OR APPLICATIONS
| | | | |
|---|---|---|---|
| 707,032 | 5/1941 | Germany | 104/148 MS |
| 1,537,842 | 8/1968 | France | 104/148 MS |

*Primary Examiner*—M. Henson Wood, Jr.
*Assistant Examiner*—Reinhard J. Eisenzopf
*Attorney, Agent, or Firm*—Craig & Antonelli

[57] ABSTRACT

An electromagnetically operated suspension vehicle which is coordinated to a guideway and which includes an asynchronous linear motor, in which the lift magnets and the linear motor together with their corresponding steel and aluminum reaction rails are arranged at the underside of the guide-way in such a manner that the vertical distance between the lift magnets and the linear motor, on the one hand, and the reaction rails, on the other, becomes larger when the lift magnets fail.

22 Claims, 11 Drawing Figures

PATENTED MAY 13 1975                3,882,789
PRIOR ART    PRIOR ART
FIG. 1a    FIG. 1b    FIG. 2a    FIG. 2b
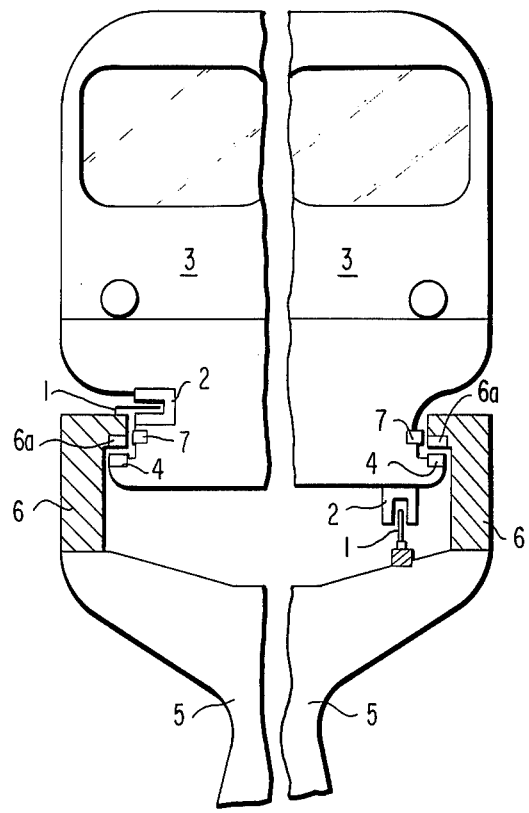
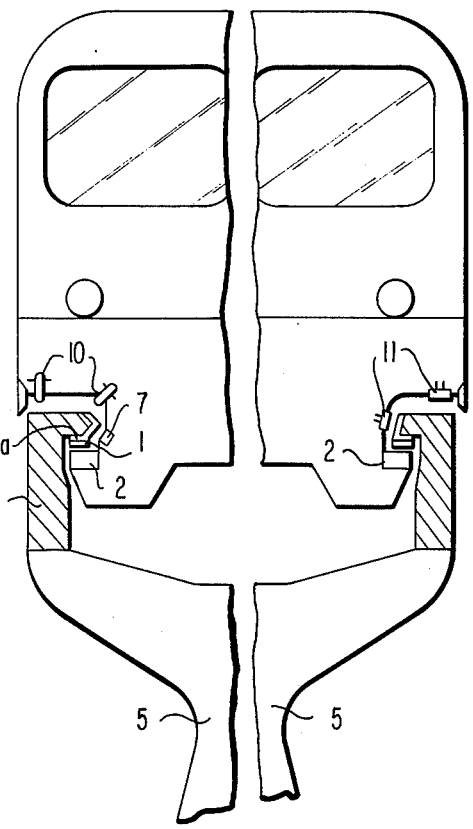
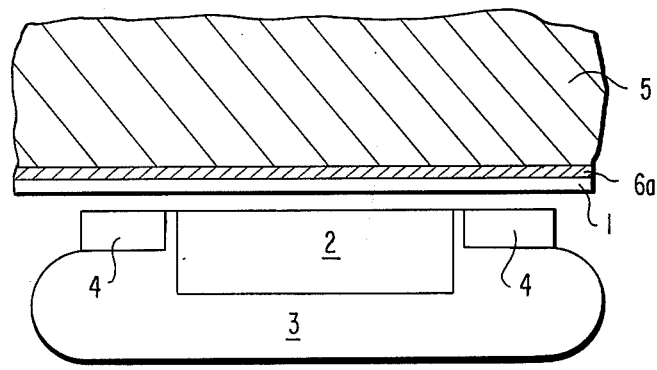
FIG. 3

ELECTROMAGNETICALLY OPERATED OVERHUNG AND/OR UNDERHUNG SUSPENSION VEHICLE

This invention relates to an electromagnetically operated overhung and/or underhung suspension vehicle having an asynchronous linear motor for cooperation with a guideway.

Electromagnetically guided and propelled overhung or underhung suspension vehicles conventionally make use of wholly separate components (propulsion and support elements) on the vehicle and on the guideway. In these prior art arrangements, the suspension is invariably achieved by means of guideway-mounted steel rails, the undersides of which produce an upward attraction for vehicle-mounted lift magnets, while separate vehicle-mounted linear motors wrap around or enclose either vertically or horizontally disposed guideway-mounted aluminum rails which are completely separate from the steel rails.

These conventional constructions entail a number of disadvantages which reside in the need for maintaining a given clearance during starting, running and deenergizing, between the components which form therebetween a narrow gap and which are in noncontacting relative sliding motion, by means of a support by way of mechanical emergency components (mechanical support members for the case when the lift magnets are not, not yet or no longer in operation). The narrowness of the gap, on the one hand, and the need to maintain clearance of the linear motors between the vehicle and the guideway, on the other, require an extremely rapid response of the mechanical emergency components, which objective can, if at all, be attained only at a considerable technical expenditures.

A principal object of the present invention is to eliminate these disadvantages by providing a solution which precludes an endangering, also without resort to extremely rapidly responding emergency components, of the linear motors when the lift magnets are ineffective or inoperable.

As solution to the underlying problem the present invention proposes to provide a suspension system in which lift magnets and linear motors, as well as corresponding aluminum and steel rails with which they cooperate, are arranged below, i.e., on the underside of the guideway, e.g., in the form of a guide beam or the like.

In the system according to this invention, the gap between the vehicle and the guideway will be enlarged when the lift magnets cease to function, so that the linear motors will not be endangered when the vehicle comes down on the guideway, also in case the mechanical emergency components do not take over in an extremely fast response time the support of the vehicle. In other words, this permits a certain amount of phase shift to occur between the failure of the lift magnets and the response of the mechanical emergency components without endangering the linear motors.

These and further objects and advantages of the present invention will become apparent from the following detailed description when taken in conjunction with the accompanying drawings, which show for purposes of illustration only, several embodiments in accordance with the present invention and wherein:

FIG. 1a and 1b are schematic cross-sectional views of two types of construction representative of the present state of the art, the two halves being each of symmetrical construction with respect to the vertical longitudinal center plane of the vehicle;

FIGS. 2a and 2b are schematic cross-sectional views illustrating a right and a left half of two symmetrically arranged embodiments in accordance with the present invention for use on an underhung suspension railway;

FIG. 3 is a schematic partial lateral view, partly in cross section, of an embodiment in accordance with the present invention for use with an overhung suspension railway;

Figure 4:
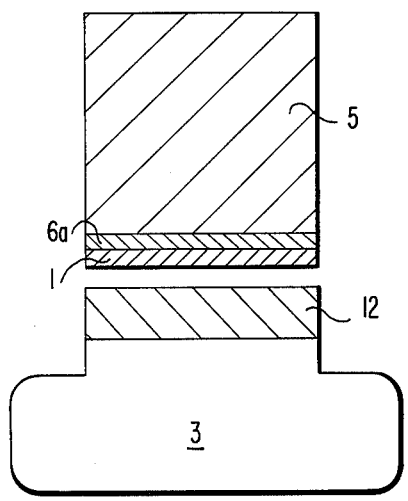
FIG. 4 through FIG. 6 are schematic cross sectional views illustrating different design features of several embodiments in accordance with this invention.

Referring now to the drawing, wherein like reference numerals are used throughout the various views to designate like parts, and more particularly to FIG. 1a and FIG. 1b, two embodiments of a vehicle and guide-way system are illustrated in these figures as will be used where the electromagnetic main components (propulsion and support systems) are separated for maximum benefit. It will be clearly and readily apparent that any emergency components to suit the emergency situation will pose considerable problems. In the left-hand embodiment shown in FIG. 1a, the horizontal linear motor 1, 2 has practically no permissive vertical drop and therefore no time is allowed for the vehicle 3 until, for example, after a failure of the lift magnets 4, a mechanical emergency system can become operable in order to support the vehicle 3 on the guideway or guide-beam 5 without causing the destruction or damage to the lift system.

This is so because the carrier or support rail 6 on the guideway 5 angles inwards and because the lift magnets 4 are attracted upwardly by means of the reaction rail 6a made from steel and disposed on the underside of this inward bend while the reaction rail 1 made from aluminum of the linear motor 1, 2 projects from the upper side of the carrier rail 6 to engage with the gap in the propulsion magnet 2 of the linear motor. If the lift magnets 4 fail and mechanical emergency supports do not go into action immediately, then the linear motor 1, 2 will be damaged if not destroyed before the emergency supports (emergency components) take effect. The same outcome is to be expected in a similar situation from the right-hand embodiment of FIG. 1b, in which the linear motor 1, 2 is arranged vertically adjacent the carrier rail 6 and the reaction rail 6a for the lift magnets 4. The aluminum reaction rail 1 is arranged vertically and engages into the likewise vertically disposed gap of the propulsion magnet 2 of the linear motor 1, 2, so that upon failure of the lift magnets 4, the propulsion magnets 2 will drop onto and make contact with the reaction rail 1 unless the emergency components are brought into action without the least delay. Lateral guide magnets 7 are arranged vertically adjacent the end faces of the inwardly extending legs of the carrier rail 6 or of a suitably disposed corresponding steel rail (reaction rail). The lower ends of the vehicle flanks are drawn inwards to accommodate the linear motors on both sides of the vehicle, a provision which creates adverse conditions also with respect to the necessary emergency support for the vehicle. On the other hand, narrow gaps between the guide-way or guide-beam and the vehicle have to be aimed at so as to maintain the necessary support and propulsion energies within reasonable limits since the power requirement increases disproportionately with an increase in the size of the gaps.

The danger described above is averted when use is made of an arrangement according to the present invention. In the solution according to the present invention illustrated in FIG. 2a the lateral guide magnets 7 are accordingly disposed opposite the chamfered underside of the guideway 5 while the lift magnets 4 and the propulsion magnets 2 of the linear motor 1, 2 are placed in line, one behind the other, opposite the underside of the bent end of the guideway 5 (FIG. 3). The aluminum reaction rails 1 for the linear motors are placed one above the other. It is apparent that upon failure of the lift magnets 4, the distance between the vehicle 3 and the underside of the guideway 5 is increased such that the distance between the propulsion magnets 2 of the linear motor 1, 2 and the lift magnets 4, on the one hand, and the reaction rails 1 and 6, on the other, is increased in such a manner that the propulsion magnets 2 and the lift magnets 4 come clear of the guideway or guide beam 5 and the emergency components 10, which serve to provide emergency support with respect to the guideway 5, are allowed sufficient time to come into action. These emergency components may be conventional support rollers 10 as shown in FIG. 2a or skids 11 as shown in FIG. 2b which, as to the rest, is similar to FIG. 2a.

For the sake of simplicity of construction the separately arranged lift magnets 4 and propulsion magnets 2 according to FIG. 3 may be replaced with so-called universal coils (FIG. 4), i.e., propulsion magnets and lift magnets are integrated into a unitary structural member 12 which cooperate again with the respective reaction rails 1 and 6a of aluminum and steel at the guideway 5. This universal coil 12 may extend over the entire width of the reaction rails, which width again preferably corresponds to the width of the guideway 5 (FIG. 4). In lieu thereof two universal coils 12a, 12b according to FIG. 5 may be arranged on both sides of the longitudinal vehicle center plane. If in this arrangement the steel reaction rail 6a is extended downwardly gate-like along the sides of the aluminum reaction rail 1 in the form of parts 13, (FIG. 5), then a good steering of the vehicle against an undesirable shuttling motion is effectively made possible.

Figure 5:
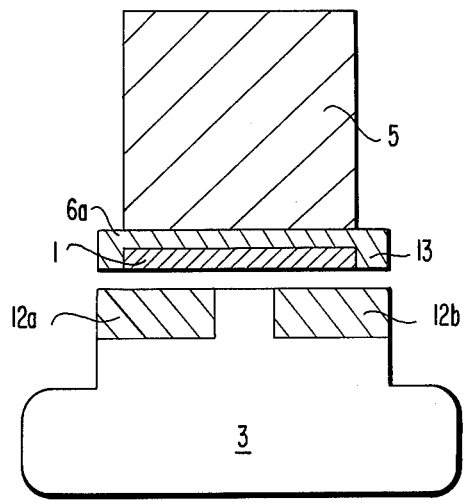
Figure 7:
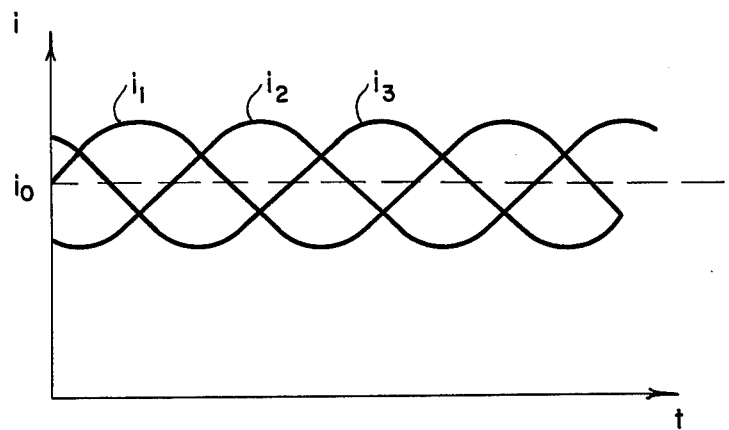
FIG. 7 is a graph illustrating the superposition of a DC field on an AC field in accordance with the present invention.
Figure 8:
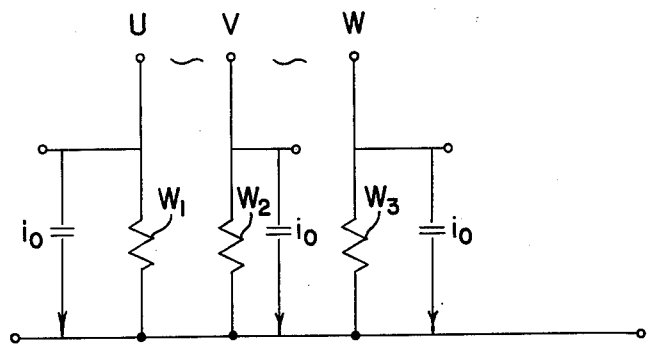
FIG. 8 is a schematic representation of a remote switching system utilizing the superposition of a DC field on an AC field in accordance with the present invention.

With the use of the universal coils in accordance with FIGS. 4 and 5, a DC field is generated for lift and an AC field is superimposed upon the DC field for propulsion as is shown in FIGS. 7 and 8. FIG. 7 is a graph illustrating the superposition of the DC field (shown by the direct current $i_0$) with an AC field consisting of individual currents $i_1$, $i_2$, and $i_3$ which are alternating currents with the currents being plotted over time $t$. FIG. 8 illustrates a remote switching system wherein between the individual phases or windings of the motor U, V, W, respectively, a three phase AC field is applied, superimposed by a DC field as each of the phases U, V and W and wherein the coils of the motor are represented as inductive resistors $W_1$, $W_2$ and $W_3$.

Figure 6A:
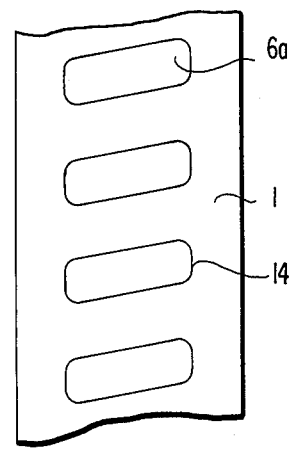
FIG. 6a is a plan view on a part of a steel and aluminum reaction rail structure of FIG. 6 in accordance with this invention.
Figure 6:
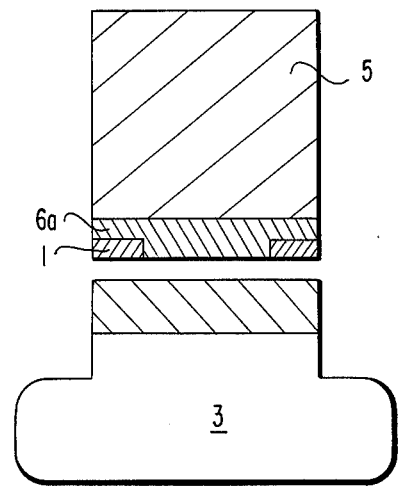

It is possible in conjunction with the use of universal coils to provide the aluminum reaction rail 1 with windows 14 through which projects the steel reaction rail 6a so that the surfaces of both reaction rails are flush, i.e., are disposed in one plane (FIGS. 6 and 6a). The length of the windows 14 is preferably so selected that the vehicle-mounted lift magnets will cover several windows irrespective of the position of the vehicle.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. An electromagnetically operated suspension vehicle which is operatively associated with a guide-way means and which includes an asynchronous linear motor means and lift magnet means cooperating with reaction rail means and including electrical coil means characterized in that the guide-way means has an underside and in that the lift magnet means and the linear motor means together with the reaction rail means with which they cooperate are arranged on the underside of the guide-way means in such a manner that the vertical distance between the lift magnet means and the linear motor means, on the one hand, and the reaction rail means, on the other, will increase in case of failure of the lift magnet means, and further characterized in that the same electrical coil means are used for the lift magnet means and the linear motor means and in that a d.c. current generating a d.c. field is provided for producing the lift while an a.c. current producing a traveling a.c. field serving for the propulsion is superimposed on the d.c. current.

2. A suspension vehicle according to claim 1, characterized in that the suspension vehicle is an over-hung suspension vehicle.

3. A suspension vehicle according to claim 1, characterized in that the suspension vehicle is an under-hung suspension vehicle.

4. A suspension vehicle according to claim 1, characterized in that said lift magnet means are at the vehicle while the reaction rail means are at the guide-way means.

5. A suspension vehicle according to claim 1, characterized in that the reaction rail means cooperating with the lift magnet means and the linear motor means are of steel and aluminum, respectively.

6. A suspension vehicle according to claim 5, characterized in that the steel reaction rail means for the lift magnet means is arranged above the aluminum reaction rail means of the linear motor means and the steel reaction rail means is effective through the aluminum reaction rail means.

7. A suspension vehicle according to claim 6, characterized in that a respective linear motor means and lift magnet means are combined in a unitary universal coil means.

8. A suspension vehicle according to claim 7, characterized in that a coil means is arranged on each of the two sides of the vehicle center longitudinal plane and each coil means extends laterally beyond the width of the guide-way means.

9. A suspension vehicle according to claim 7, characterized in that the unitary universal coil means extends over a width of the vehicle which corresponds substantially to the full width of the guide-way means.

10. A suspension vehicle according to claim 5, characterized in that the steel rail means is located above the aluminum rail means and the steel rail means projects through windows provided in the aluminum rail means so that the surface of the aluminum rail means is interrupted in regular intervals by the steel rail means.

11. A suspension vehicle according to claim 10, characterized in that the lift magnet means of the vehicle cover in each position of the vehicle several windows in the aluminum rail means.

12. A suspension vehicle according to claim 11, characterized in that the linear motor means and lift magnet means are arranged one behind the other as viewed in the driving direction.

13. A suspension vehicle according to claim 11, characterized in that one lift magnet means each is arranged in front and to the rear of the linear motor means as seen in the driving direction.

14. A suspension vehicle according to claim 11, characterized in that the linear motor means and lift magnet means are arranged adjacent one another.

15. A suspension vehicle according to claim 1, characterized in that the linear motor means and lift magnet means are arranged one behind the other as viewed in the driving direction.

16. A suspension vehicle according to claim 15, characterized in that one lift magnet means each is arranged in front and to the rear of the linear motor means as seen in the driving direction.

17. A suspension vehicle according to claim 1, characterized in that the linear motor means and lift magnet means are arranged adjacent one another.

18. A suspension vehicle according to claim 1, characterized in that a respective linear motor means and lift magnet means are combined in a unitary universal coil means.

19. A suspension vehicle according to claim 18, characterized in that the unitary universal coil means extends over a width of the vehicle which corresponds substantially to the full width of the guide-way means.

20. A suspension vehicle according to claim 1, characterized in that a coil means is arranged on each of the two sides of the vehicle center longitudinal plane and each coil means extends laterally beyond the width of the guide-way means.

21. An electromagnetically operated suspension vehicle which is operatively associated with a guide-way means and which includes an asynchronous linear motor means and lift magnet means cooperating with reaction rail means, characterized in that a coil means is arranged horizontally in a single horizontal plane on each of two sides of the vehicle center longitudinal plane with a portion of the vehicle therebetween and each coil means extends laterally beyond the width of the guide-way means.

22. A suspension vehicle according to claim 21, characterized in that the reaction rail means cooperating with the magnet means and the linear motor means are of steel and aluminum, respectively, that the steel rail means is located above the aluminum rail means and extends beyond the width of the guide-way means and the aluminum rail means and downwardly on each side of the aluminum rail means so as to have a width conforming to the width of the coil means extending beyond the width of the guide-way means.

* * * * *